US008973557B2

(12) United States Patent
Ammon

(10) Patent No.: US 8,973,557 B2
(45) Date of Patent: Mar. 10, 2015

(54) FUEL OVERFLOW VALVE FOR A FUEL INJECTION SYSTEM, AND FUEL INJECTION SYSTEM HAVING A FUEL OVERFLOW VALVE

(75) Inventor: Volkhard Ammon, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 1345 days.

(21) Appl. No.: 12/741,494

(22) PCT Filed: Sep. 18, 2008

(86) PCT No.: PCT/EP2008/062443

§ 371 (c)(1), (2), (4) Date: May 5, 2010

(87) PCT Pub. No.: WO2009/059833

PCT Pub. Date: May 14, 2009

(65) Prior Publication Data

US 2010/0258092 A1 Oct. 14, 2010

(30) Foreign Application Priority Data

Nov. 5, 2007 (DE) ......................... 10 2007 052 665

(51) Int. Cl.
*F16K 17/08* (2006.01)
*F16K 17/10* (2006.01)
*F02M 37/00* (2006.01)

(52) U.S. Cl.
CPC ................................. *F02M 37/0029* (2013.01)
USPC ......................... 123/506; 137/513.3; 137/514

(58) Field of Classification Search
CPC ........ F16K 17/08; F16K 17/082; F16K 17/10
USPC ................. 123/506, 510, 511, 514, 457, 459; 137/513.3, 514
See application file for complete search history.

(56) References Cited

U.S. PATENT DOCUMENTS 3,524,465 A * 8/1970 Sadler ...................... 137/115.06
3,707,981 A * 1/1973 Sadler et al. ............. 137/115.16

(Continued)

FOREIGN PATENT DOCUMENTS

DE 19541086 A1 6/1996
EP 0392187 A1 10/1990

(Continued)

*Primary Examiner* — Mahmoud Gimie
*Assistant Examiner* — David Hamaoui
(74) *Attorney, Agent, or Firm* — Michael Best & Friedrich LLP

(57) ABSTRACT

The invention relates to a fuel overflow valve for a fuel injection system, particularly for limiting the pressure in a low-pressure region of the fuel injection system. The fuel overflow valve has a valve housing, in which a valve member is disposed in a stroke-moving manner, the stroke movement of the valve member controlling a connection of an inlet to the valve housing to a release region. The valve member is loaded by a valve spring in the direction of a locking position in which the connection of the inlet to the release region is interrupted, and is loaded by the pressure present in the inlet in the opening direction. The valve member may carry out a further stroke in the locking direction beyond the locking position thereof, where the valve spring does not act upon the valve member. Due to the increased stroke of the valve member, an improved balance of pressure and volume fluctuations is enabled in the low pressure region and the stroke of the valve spring, and thus the stress thereof, may be kept low.

21 Claims, 5 Drawing Sheets

(56) References Cited

U.S. PATENT DOCUMENTS

| | | | | |
|---|---|---|---|---|
| 3,782,412 | A * | 1/1974 | Darash | 137/514 |
| 4,577,606 | A * | 3/1986 | Bohringer et al. | 123/506 |
| 5,623,910 | A * | 4/1997 | Riggle | 123/510 |
| 6,361,458 | B1 * | 3/2002 | Smith | 474/109 |
| 6,422,212 | B1 | 7/2002 | Faix et al. | |
| 6,742,540 | B2 * | 6/2004 | Kim | 137/513.3 |
| 7,086,388 | B2 * | 8/2006 | Roth et al. | 123/510 |
| RE41,861 | E * | 10/2010 | Landhuis | 137/565.35 |
| 2004/0000341 | A1 | 1/2004 | Kim | |

FOREIGN PATENT DOCUMENTS

| | | | |
|---|---|---|---|
| EP | 1338787 | A1 | 8/2003 |
| JP | 11270431 | | 10/1999 |
| JP | 2002005320 | | 1/2002 |
| JP | 2005024022 | A | 1/2005 |

* cited by examiner

FUEL OVERFLOW VALVE FOR A FUEL INJECTION SYSTEM, AND FUEL INJECTION SYSTEM HAVING A FUEL OVERFLOW VALVE

CROSS-REFERENCE TO RELATED APPLICATION

This application is a 35 USC 371 application of PCT/EP2008/062443 filed on Sep. 18, 2008.

BACKGROUND OF THE INVENTION

1. Field of the Invention

The invention is based on a fuel overflow valve for a fuel injection system and on a fuel injection system having a fuel overflow valve.

2. Description of the Prior Art

One such fuel overflow valve and one such fuel injection system are known from German Patent Disclosure DE 100 57 244 1. This fuel overflow valve serves to limit pressure in a low-pressure region of the fuel injection system. The fuel overflow valve has a valve housing, in which a valve member is reciprocatably disposed. By means of the valve member, upon its reciprocating motion, the connection of an inlet from the low-pressure region with an outlet to a relief region is controlled. The valve member is urged by a valve spring in the direction of a closing position in which the connection of the inlet with the outlet is interrupted, and is urged in the opening direction by the pressure prevailing in the inlet. If the pressure in the low-pressure region exceeds the opening pressure determined by the valve spring, the fuel overflow valve opens, and fuel can flow from the inlet out of the low-pressure region via the outlet into a relief region, such as a return to the fuel tank. The fuel injection system has a high-pressure pump, by which fuel is delivered by high pressure to at least one injector at least indirectly, for instance via a reservoir. By means of a feed pump, fuel is delivered to the high-pressure pump. The high-pressure pump has at least one pump piston that is driven in a reciprocating motion by a drive mechanism disposed in a drive region. The low-pressure region of the fuel injection system extends between the feed pump and the high-pressure pump, and in this low-pressure region, a low pressure generated by the feed pump prevails. The low-pressure region communicates with the drive region of the high-pressure pump. Because of the reciprocating motion of the at least one pump piston, the volume of the drive region varies, since in the outlet-oriented stroke of the pump piston, the volume of the drive region is increased, and in the inlet-oriented stroke of the pump piston, the volume of the drive region is decreased. As a result, pressure fluctuations are created in the drive region. Especially in the case of a high-pressure pump with only one pump piston, relatively strong pressure fluctuations are created. As a result, pressure fluctuations are generated in the entire low-pressure region as well, and they can impair the function of the fuel injection system. To compensate for these pressure fluctuations, the valve member of the fuel overflow valve must be capable of executing a long stroke, which accordingly necessitates a long stroke of the valve spring as well. This in turn means that a large amount of space is necessary for the valve spring, and the valve spring is heavily loaded and can therefore break.

ADVANTAGES AND SUMMARY OF THE INVENTION

The fuel overflow valve according to the invention has the advantage over the prior art that the valve member, independently of the valve spring, can execute a longer stroke, making improved compensation for the pressure fluctuations possible. The valve spring needs to execute only a limited stroke in order to move the valve member into its closing position, and as a result the installation space for the fuel overflow valve can be kept small and the load on the valve spring can be kept slight. Corresponding advantages result for the fuel injection system according to the invention whose function is improved by the reduced pressure fluctuations in the low-pressure region.

One aspect of the invention, in a simple way, enables the increased stroke of the valve member compared to the valve spring stroke. By another aspect of the invention, damping of the reciprocating motion of the support element and thus of the valve member and the valve spring is attained, thus reducing the load on the valve spring. Another aspect of the invention likewise enables damping of the reciprocating motion of the support element and thus of the valve member and the valve spring. Another aspect of the invention, without modifications to the valve housing, makes a two-stage embodiment of the fuel overflow valve possible.

BRIEF DESCRIPTION OF THE DRAWINGS

Two exemplary embodiments of the invention are described in further detail in the ensuing description in conjunction with the drawings, in which.

DESCRIPTION OF THE PREFERRED EMBODIMENTS

Figure 1:
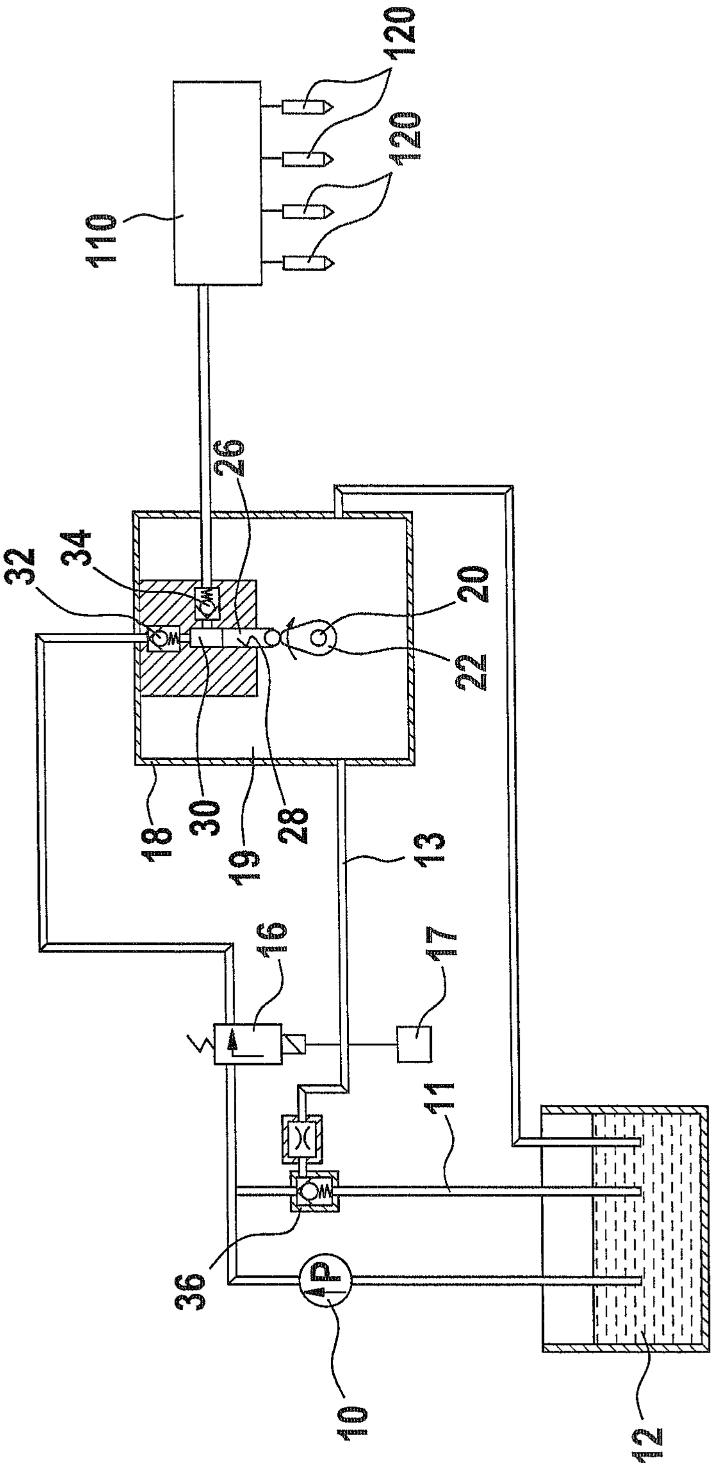
FIG. 1 shows a fuel injection system in a simplified schematic illustration.

In FIG. 1, a fuel injection system for an internal combustion engine is shown. The fuel injection system has a feed pump 10, which aspirates fuel from a fuel tank 12 and delivers it to the intake side of a high-pressure pump 18. By the feed pump 10, the fuel is compressed to a delivery pressure of approximately 4 to 6 bar, for example. The feed pump 10 may be driven electrically or mechanically. Between the feed pump 10 and the intake side of the high-pressure pump 18, there can be a fuel metering device 16, by which the quantity of fuel aspirated by the high-pressure pump 18 and delivered at high pressure can be variably adjusted. The fuel metering device 16 may be a proportional valve that is capable of adjusting variously large flow cross sections, or it may be a clocked valve, and it is triggered mechanically or electrically by an electronic control device 17.

The high-pressure pump 18 has a housing, in which in an inner chamber 19 a rotationally driven drive shaft 20 is disposed. The inner chamber 19 of the housing having the drive shaft 20 forms a drive region of the high-pressure pump 18. The drive shaft 20 has at least one cam 22 or eccentric element, and the cam 22 may also be embodied as a multiple cam. The high-pressure pump has at least one or more pump elements, each with one pump piston 26 that is driven indirectly by the cam 22 of the drive shaft 20 in a reciprocating motion in a direction that is at least approximately radial to the axis of rotation of the drive shaft 20. The pump piston 26 is guided tightly in a cylinder bore 28 and, with its side remote from the drive shaft 20, it defines a pump work chamber 30. The pump work chamber 30 has a connection with the fuel inlet from the feed pump 10, via an inlet valve 32 that opens into the pump work chamber 30. Furthermore, via an outlet valve 34 opening out of the pump work chamber 30, the pump work chamber 30 has a connection with an outlet that is in communication with a high-pressure reservoir 110, for instance. One or preferably more injectors 120, disposed at the cylinders of the engine, communicate with the high-pressure reservoir 110 and through them the fuel is injected into the cylinders of the engine. The high-pressure reservoir 110 may also be omitted; in that case, the high-pressure pump 18 communicates with the injectors 120 via hydraulic lines. In its intake stroke, the pump piston 26 moves into the inner chamber 19 and in the process aspirates fuel, via the open inlet valve 32, from the inlet from the feed pump 10 into the pump work chamber 30. In its delivery stroke, the pump piston 26 moves out of the inner chamber 19 and delivers fuel at high pressure from the pump work chamber 30, via the open outlet valve 34, into the high-pressure reservoir 110 or to the injectors 120.

The region between the feed pump 10 and the fuel metering device 16 forms a low-pressure region, in which the pressure generated by the feed pump 10 prevails. By means of the feed pump 10, the same fuel quantity is constantly delivered, but as a function of the setting of the fuel metering device 16, a variable fuel quantity is aspirated by the high-pressure pump 18. For that reason, a fuel overflow valve 36 is provided, by which the pressure in the low-pressure region is limited. The fuel overflow valve 36 opens if the pressure in the low-pressure region exceeds its opening pressure, and via the open fuel overflow valve 36, the quantity of fuel delivered by the feed pump 10, but not aspirated by the high-pressure pump 18, is diverted into a relief region, which is for instance a return 11 to the fuel tank 12.

Figure 2:
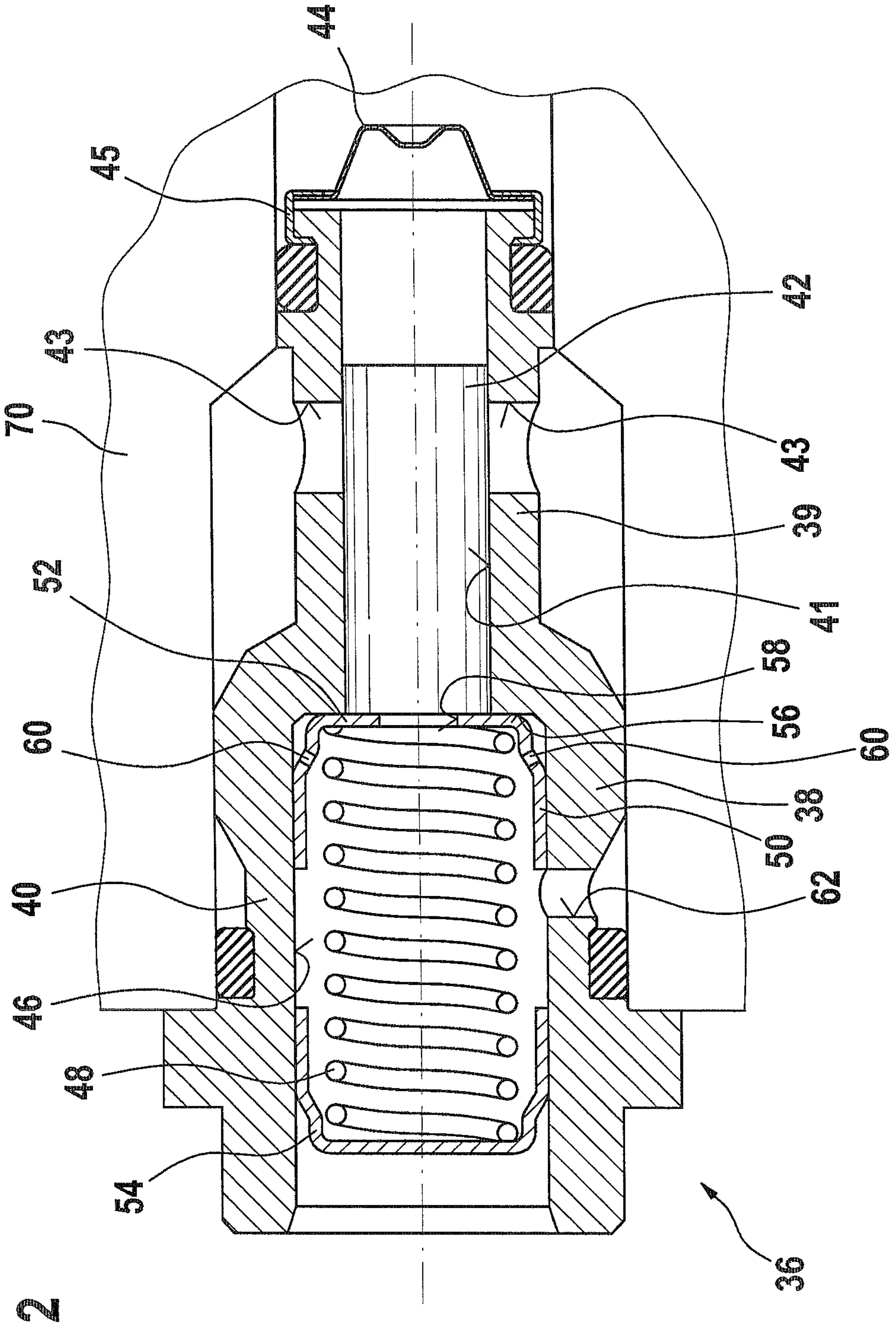
FIG. 2 shows a fuel overflow valve of the fuel injection system in a first exemplary embodiment in the closed state, in a longitudinal section, with a valve member in a first position.
Figure 3:
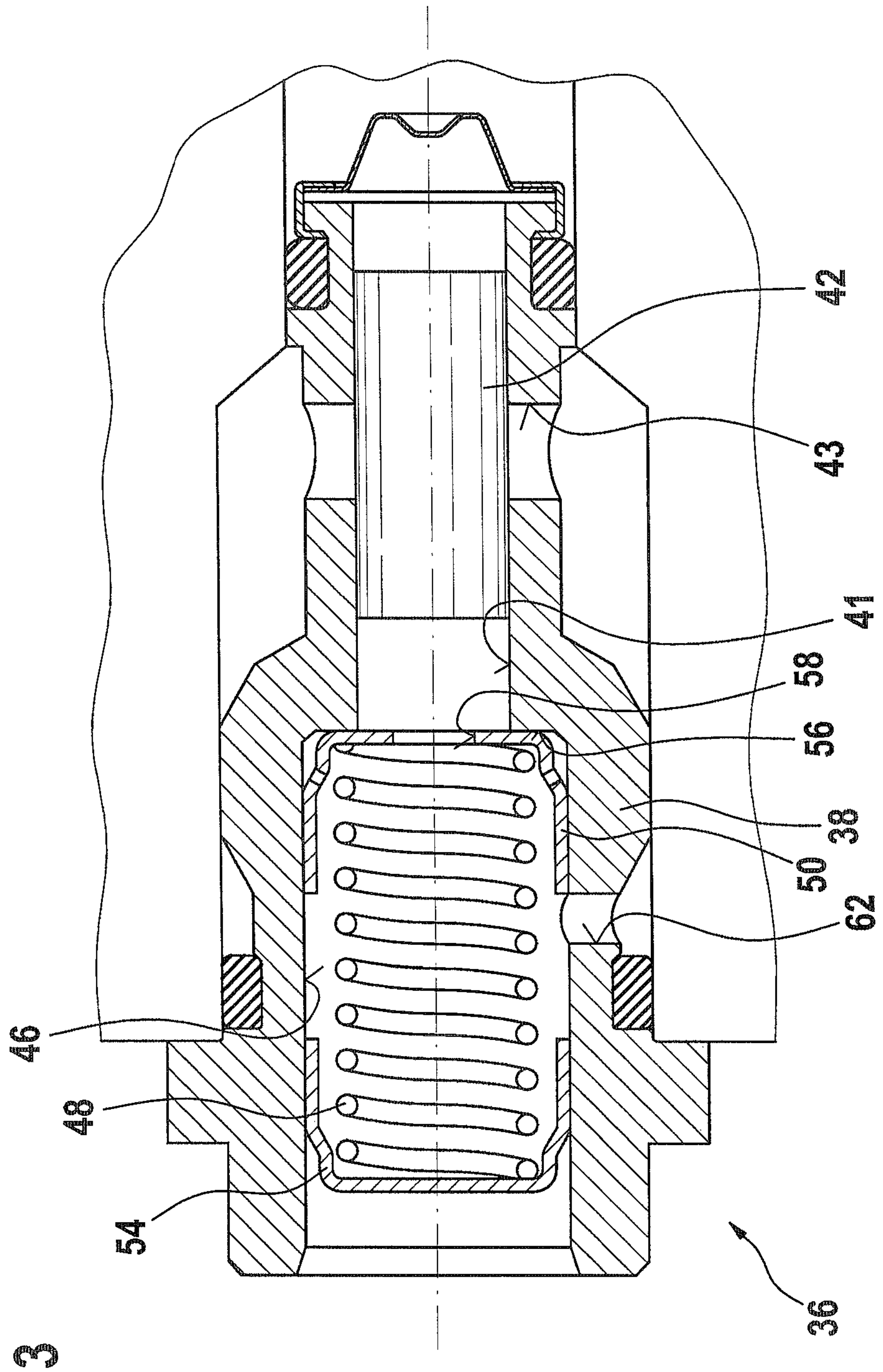
FIG. 3 shows the fuel overflow valve in the closed state with the valve member in a second position.
Figure 4:
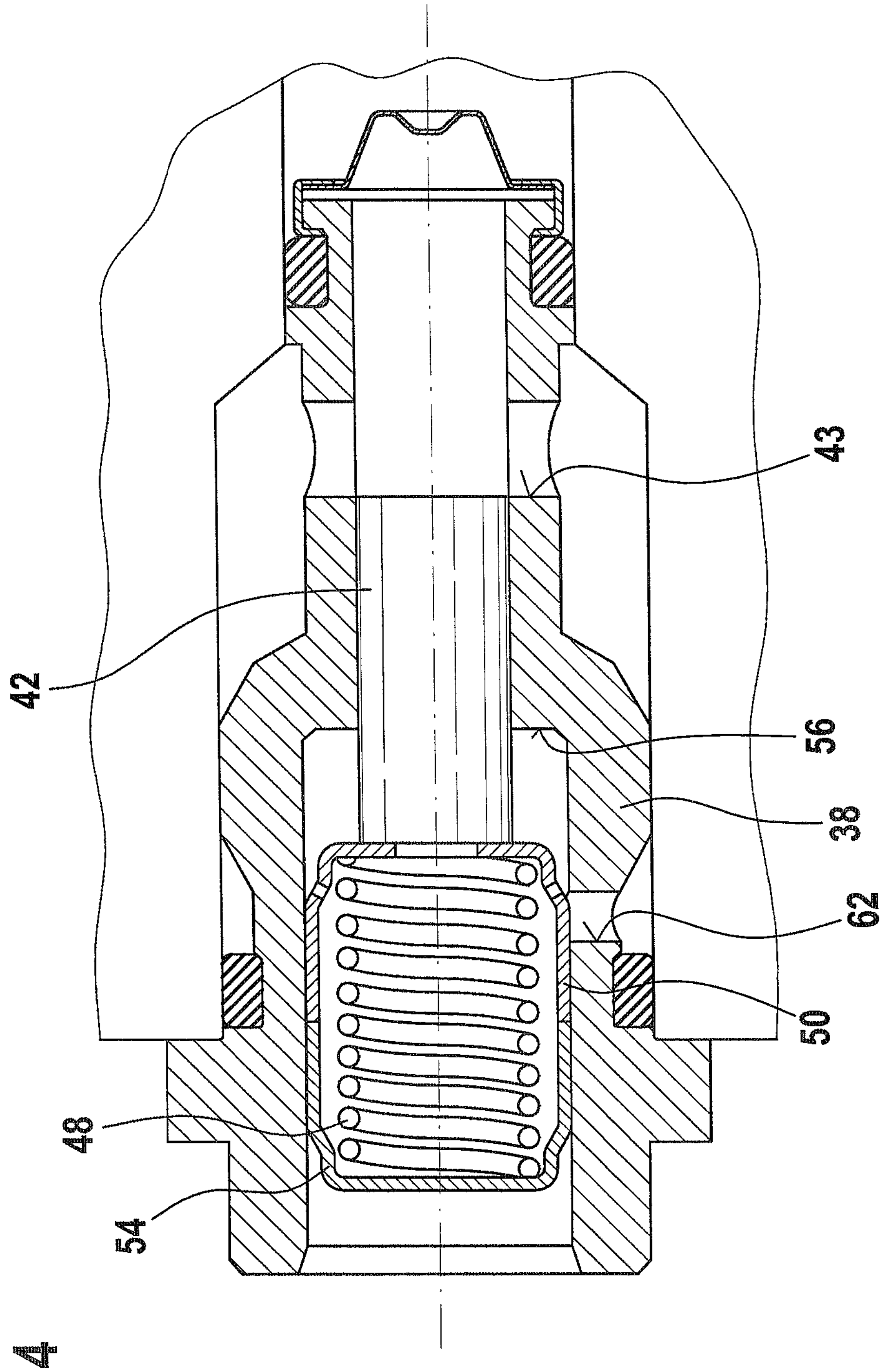
FIG. 4 shows the fuel overflow valve in the open state.

The fuel overflow valve 36, in a first exemplary embodiment, will now be described in further detail in conjunction with FIGS. 2 through 4. The fuel overflow valve 36 has a tubular valve housing 38, which has one tubular portion 39 of lesser diameter and one tubular portion 40 of greater diameter. In the portion 39 of the valve housing 38, a pistonlike valve member 42 is guided displaceably tightly in a longitudinal bore 41. In the portion 39 of the valve housing 38, at least one opening 43 is provided, which connects the longitudinal bore 41 to the outer jacket of the portion 39. The opening 43 is preferably embodied as a bore; for example, two diametrically opposed bores are provided. Via the openings 43, the longitudinal bore 41 can be made to communicate with a relief region, such as a return to the fuel tank 12. The pressure prevailing in the low-pressure region acts via the open end of that region in the longitudinal bore 41 in the valve housing 38 as well and thus acts on the face end of the valve member 42. Hence the open end of the longitudinal bore 41 forms an inlet from the low-pressure region into the fuel overflow valve 36. When the valve member 42 covers the openings 43, the inlet, that is, the low-pressure region, is disconnected from the relief region, and when the valve member 42 at least partially uncovers the openings 43, the inlet, or in other words the low-pressure region, is in communication with the relief region. Hence the valve member 42, with the openings 43, forms a slide valve. On the open end of the longitudinal bore 41 on the valve housing 38, a filter screen 44 may be disposed, by which dirt particles are prevented from being able to enter the longitudinal bore 41 from the low-pressure region. The filter screen 44 may be fixed to the valve housing 38 by means of an annular securing element 45, and the securing element can be connected to the valve housing 38 by means of a crimp, for instance.

A valve spring 48, which acts on the valve member 42 via a support element 50, is disposed in a longitudinal bore 46 of the portion 40 of the valve housing 38 that extends at least approximately coaxially to the longitudinal bore 41 but has a greater diameter than the latter. The support element 50 is embodied in cuplike fashion, and its bottom 52 points toward the valve member 42, and its open end points away from the valve member 42. The support element 50 is guided displaceably in the longitudinal bore 46, and protruding into this bore, from its open end, is the valve spring 48, which is embodied as a helical compression spring and rests on the bottom 52. The end, remote from the valve member 42, of the longitudinal bore 46 of the valve housing 38 is closed by means of an insert part 54, which also acts as a brace for the valve spring 48. The insert part 54 may be embodied in cuplike fashion like the support element 50, and its open end points toward the valve member 42, and the valve spring 48 protrudes into the insert part 54 and is braced on the bottom thereof. The insert part 54 is fixed in the longitudinal bore 46, for instance being press-fitted into it. The support element 50 and/or the insert part 54 may be embodied as a shaped sheet-metal part.

The support element 50 is not connected to the valve member 42; instead, it only comes to rest with its bottom 52 on the valve member 42 as a result of the action of the valve spring 48. Toward the valve member 42, the support element 50 can execute a maximum stroke which is limited by contact of the support element 50 with an annular shoulder 56, formed at the transition from the longitudinal bore 46 to the smaller-diameter longitudinal bore 41. There is at least one opening 58 of large cross section in the bottom 52 of the support element 50. In the peripheral region of the bottom 52, near its transition to the jacket face of the support element 50, at least one opening 60 of small cross section is provided. The longitudinal bore 46 can be made to communicate with a relief region, which may for instance be a return to the fuel tank 12, via at least one opening 62 that opens out at the outer jacket of the portion 40 of the valve housing 38. When the support element 50 is in contact with the annular shoulder 56, it does not cover the opening 62, and thus the longitudinal bore 46 is in communication with the relief region. When the support element 50, beginning at its contact with the annular shoulder 56, moves into the longitudinal bore 46, then the opening 62 is increasingly covered by it, and thus the cross section is reduced and may be closed entirely, so that the longitudinal bore 46 now communicates with or is disconnected from the relief region via only a small, throttling flow cross section.

The fuel overflow valve 36 with the valve housing 38, the valve member 42, the valve spring 48, the support element 50, and the insert part 54 as well as the filter screen 44, forms a preassembled unit that is inserted into a receiving housing 70. The receiving housing 70 may be a separate housing or a part of the housing of the high-pressure pump 18.

The function of the fuel overflow valve 36 will now be described in further detail. The length of the valve member 42 and the position of the annular shoulder 56 in the valve housing 38 for limiting the stroke of the support element 50 are adapted to one another such that the valve member 42, when the support element 50 is in contact with the annular shoulder 56, just covers the openings 43 and thus undoes the connection of the low-pressure region with the relief region. The valve member 42 is shown in that position in FIG. 2. Beginning at that position, the valve member 42 can move still farther in the direction toward the open end of the longitudinal bore 41, whereupon the valve member 42 is no longer in contact with the support element 50, and thus the valve spring 48 no longer acts on the valve member 42. The valve member 42 is thus freely movable in the longitudinal bore 41, in accordance with the difference between the pressure in the low-pressure region acting on one face end of the valve member and the pressure in the longitudinal bore 46 acting on its other face end. By means of the valve spring 48, the valve member 42 can be moved into its closing position, and independently of the valve spring 48, the valve member 42 can execute a still further stroke past its closing position, and thus stroke can be limited for instance by the filter screen 44 or the securing element 45, in order to prevent the valve member from moving out of the longitudinal bore 41. The valve member 42 is shown in FIG. 3 in this terminal position.

If the pressure prevailing in the low-pressure region is not sufficient to displace the valve member 42, counter to the force of the valve spring 48, so far in the longitudinal bore 41 that the openings 43 are opened by the valve member 42, then the low-pressure region is disconnected from the relief region. If the pressure prevailing in the low-pressure region attains the opening pressure of the fuel overflow valve 36, then the valve member 42 is displaced in the longitudinal bore 41 counter to the force of the valve spring 48, so that the openings 43 are opened by the valve member 42, and the low-pressure region is in communication with the relief region, so that fuel can flow out of the low-pressure region into the relief region. The valve member 42 is shown in FIG. 4 in this open position.

If the openings 43 are covered by the valve member 42, or in other words the low-pressure region is disconnected from the relief region, then the valve member 42 can nevertheless execute a further stroke toward the open end of the longitudinal bore 41 and can thus at least partially compensate for fluctuations in pressure and volume in the low-pressure region. The stroke executed by the support element 50 and the valve spring 48 is shorter than the possible stroke of the valve member 42. This leads to lesser loads on the valve spring 48, which can accordingly be dimensioned more weakly. The maximum stroke of the support element 50 and of the valve member 42, and thus the maximum spring travel of the valve spring 48, are limited by the fact that the support element 50 comes to rest on the insert part 54. At this point, the valve spring 48 is preferably not yet compressed to a block.

By means of the at least one opening 58 in the bottom 52 of the support element 50, it is ensured that the valve member 42 can easily come loose from the support element 50 and come into contact with it again. Through the at least one opening 60 in the support element 50, a pressure compensation between the two sides of the support element 50 is ensured, so that the support element can move within the fuel-filled longitudinal bore 46. By means of the stroke-dependent control of the opening 62 by the support element 50, damping of the opening reciprocating motion of the valve member 42 and of the support element 50 is also attained, as a result of which the load on the valve spring 48 is reduced, since the opening reciprocating motion is damped by the fuel pressure that builds up in the longitudinal bore 46.

Figure 5:
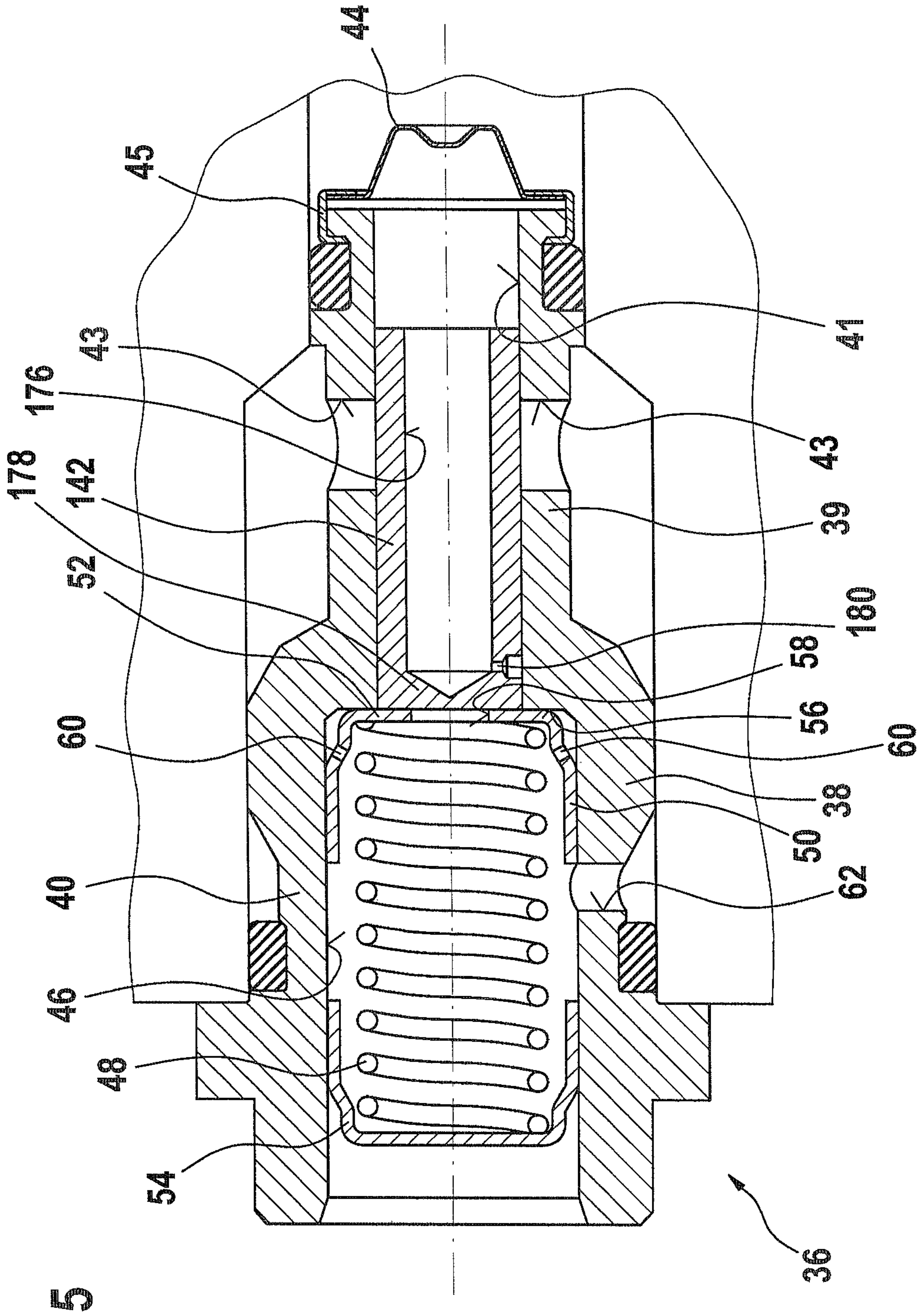
FIG. 5 shows the fuel overflow valve in a second exemplary embodiment in the closed state.

In FIG. 5, the fuel overflow valve 36 is shown in a second exemplary embodiment, in which it opens in two stages and controls two connections of the low-pressure region. The valve housing 38, the support element 50, the valve spring 48, the insert part 54, and the filter screen 44 and its securing element 45 are embodied identically to the first exemplary embodiment. Only the valve member 142 is embodied differently from the first exemplary embodiment, but the outer dimensions of the valve member 142, that is, its diameter and length, are identical to those in the first exemplary embodiment. The valve member 142, in a departure from the first exemplary embodiment, is embodied as hollow and has a blind bore 176, originating at the end remote from the valve spring 48, and the bottom 178 of the valve member 142 that comes to rest on the support element 50 is embodied as closed. Near the closed end of the valve member 142, at least one opening 180 is provided on it, for instance in the form of a bore, through which the blind bore 176 communicates with the outer jacket of the valve member 142. The opening 180 is preferably embodied as a throttle bore of defined cross section. The interior of the blind bore 176 is constantly acted upon by the pressure prevailing in the low-pressure region.

If by the action of the valve spring 48 the valve member 142 is located in its closing position, then it covers the openings 43, and the orifice of the opening 180 is located inside the longitudinal bore 41 and is covered by it. The low-pressure region is thus disconnected from the relief regions. If the pressure in the low-pressure region suffices to move the valve member 142 counter to the force of the valve spring 48, then initially at a slight opening stroke of the valve member 142, the opening 180 emerges from the longitudinal bore 41, so that the low-pressure region communicates with the opening 62 via the blind bore 176, the opening 180, and the at least one opening 60 in the support element 50, and fuel can flow out of the low-pressure region via this opening 62. At this slight opening stroke of the valve member 142, the openings 43 continue to be covered by the valve member and remain closed, so that no fuel can flow out of the low-pressure region via the openings 43. Upon a further opening stroke of the valve member 142, the openings 43 are uncovered by it, so that fuel can flow out of the low-pressure region into the return 11 (FIG. 1) via the openings 43 as well.

It is advantageous for the two-stage version of the fuel overflow valve 36 to be employed in a fuel injection system in which only a portion of the fuel quantity delivered by the feed pump 10 is supplied to the inner chamber 19 of the high-pressure pump 18 for the sake of lubricating and cooling its drive mechanism. If the pressure prevailing in the low-pressure region is not sufficient to open the fuel overflow valve 36, then the entire fuel quantity delivered by the feed pump 10 is supplied via the fuel metering device 16 to the high-pressure pump 18 for delivery. If the pressure prevailing in the low-pressure region reaches a first limit value, then the fuel overflow valve 36 opens in the first stage, and the quantity of fuel flowing out, upon opening of the first stage, of the blind bore 176, the opening 180, the at least one opening 60 in the support element 50, and the opening 62 is supplied in accordance with FIG. 1 to the inner chamber 19 via a line 13. This ensures first a rapid fuel delivery by means of the high-pressure pump 18 upon starting of the engine, and after that, it ensures adequate lubrication and cooling of the drive region of the high-pressure pump 18. When the pressure prevailing in the low-pressure region reaches a second, higher limit value, then the second stage of the fuel overflow valve 36 opens as well, because the valve member 142 uncovers the openings 43, and fuel can flow out of the low-pressure region into the fuel tank 12 via the return 11.

The foregoing relates to the preferred exemplary embodiments of the invention, it being understood that other variants and embodiments thereof are possible within the spirit and scope of the invention, the latter being defined by the appended claims.

What is claimed is:

1. A fuel overflow valve for a fuel injection system, in particular for pressure limitation in a low-pressure region of the fuel injection system, having:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member can execute a further stroke in the closing direction past its closing position, in which stroke the valve member is free to reciprocate within the valve housing without the influence of a spring.

2. The fuel overflow valve as defined by claim 1, wherein the valve spring acts on the valve member via a support element that is not connected to the valve member, and the support element comes to rest in the closing direction, in the vicinity of the closing position of the valve member, on a stop in the valve housing.

3. The fuel overflow valve as defined by claim 2, wherein the support element is embodied in cup-shaped fashion, the valve spring protrudes into the support element and rests on a bottom thereof, and the support element, with its bottom, comes to rest on the valve member.

4. The fuel overflow valve as defined by claim 2, wherein by means of the valve member, a throttled connection of the inlet with an outlet is also controlled, and upon a stroke of the valve member in the opening direction, at a short opening stroke, first the throttled connection of the inlet with the outlet is opened by the valve member, and upon a longer opening stroke, the connection of the inlet with the relief region is opened.

5. The fuel overflow valve as defined by claim 4, wherein the valve member is embodied in pistonlike fashion, is guided tightly in a longitudinal bore of the valve housing, and has a blind bore open toward its end remote from the valve spring, which blind bore communicates constantly with the inlet, the connection with the relief region leads away from the longitudinal bore at a jacket of the valve member, and this connection is controlled by an open face end of the valve member, the throttled connection includes at least one opening, which leads away from the blind bore near a closed bottom, oriented toward the valve spring, of the valve member and opens out at the jacket of the valve member, and the connection with the outlet is controlled by coincidence of this opening with the longitudinal bore.

6. The fuel overflow valve as defined by claim 2, wherein the support element is guided displaceably in the valve housing and in the valve housing defines a chamber in which the valve spring is disposed, this chamber has a connection with a relief region, and this connection is controlled by the support element as a function of a stroke of the support element.

7. The fuel overflow valve as defined by claim 6, wherein the support element is embodied in cup-shaped fashion, the valve spring protrudes into the support element and rests on a bottom thereof, and the support element, with its bottom, comes to rest on the valve member.

8. The fuel overflow valve as defined by claim 7, wherein the support element, in the region of its bottom in which the support element comes to rest on the valve member, has at least one first opening of large cross section, and in a region of its bottom outside the contact with the valve member, it has at least one second opening of small cross section.

9. The fuel overflow valve as defined by claim 1, wherein by means of the valve member, a throttled connection of the inlet with an outlet is also controlled, and upon a stroke of the valve member in the opening direction, at a short opening stroke, first the throttled connection of the inlet with the outlet is opened by the valve member, and upon a longer opening stroke, the connection of the inlet with the relief region is opened.

10. A fuel overflow valve for a fuel injection system, in particular for pressure limitation in a low-pressure region of the fuel injection system, having:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member can execute a further stroke in the closing direction past its closing position, in which stroke the valve spring does not act on the valve member wherein the valve spring acts on the valve member via a support element that is not connected to the valve member, and the support element comes to rest in the closing direction, in the vicinity of the closing position of the valve member, on a stop in the valve housing;

wherein the support element is guided displaceably in the valve housing and in the valve housing defines a chamber in which the valve spring is disposed, this chamber has a connection with a relief region, and this connection is controlled by the support element as a function of a stroke of the support element; and wherein the connection of the chamber with the relief region is opened when the support element rests on the stop and is closed by the support element upon motion of the support element in the direction toward the opening position of the valve member.

11. The fuel overflow valve as defined by claim 10, wherein the support element is embodied in cup-shaped fashion, the valve spring protrudes into the support element and rests on a bottom thereof, and the support element, with its bottom, comes to rest on the valve member.

12. The fuel overflow valve as defined by claim 11, wherein the support element, in the region of its bottom in which the support element comes to rest on the valve member, has at least one first opening of large cross section, and in a region of its bottom outside the contact with the valve member, it has at least one second opening of small cross section.

13. The fuel overflow valve as defined by claim 12, wherein by means of the valve member, a throttled connection of the inlet with an outlet is also controlled, and upon a stroke of the valve member in the opening direction, at a short opening stroke, first the throttled connection of the inlet with the outlet is opened by the valve member, and upon a longer opening stroke, the connection of the inlet with the relief region is opened.

14. The fuel overflow valve as defined by claim 13, wherein the valve member is embodied in pistonlike fashion, is guided tightly in a longitudinal bore of the valve housing, and has a blind bore open toward its end remote from the valve spring, which blind bore communicates constantly with the inlet, the connection with the relief region leads away from the longitudinal bore at a jacket of the valve member, and this connection is controlled by an open face end of the valve member, the throttled connection includes at least one opening, which leads away from the blind bore near a closed bottom, oriented toward the valve spring, of the valve member and opens out at the jacket of the valve member, and the connection with the outlet is controlled by coincidence of this opening with the longitudinal bore.

15. The fuel overflow valve as defined by claim 13, wherein the valve member is embodied in pistonlike fashion, is guided tightly in a longitudinal bore of the valve housing, and has a blind bore open toward its end remote from the valve spring, which blind bore communicates constantly with the inlet, the connection with the relief region leads away from the longitudinal bore at a jacket of the valve member, and this connection is controlled by an open face end of the valve member, the throttled connection includes at least one opening, which leads away from the blind bore near a closed bottom, oriented toward the valve spring, of the valve member and opens out at the jacket of the valve member, and the connection with the outlet is controlled by coincidence of this opening with the longitudinal bore.

16. A fuel overflow valve for a fuel injection system, in particular for pressure limitation in a low-pressure region of the fuel injection system, having:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member can execute a further stroke in the closing direction past its closing position, in which stroke the valve spring does not act on the valve member;

wherein the valve spring acts on the valve member via a support element that is not connected to the valve member, and the support element comes to rest in the closing direction, in the vicinity of the closing position of the valve member, on a stop in the valve housing;

wherein the support element is embodied in cup-shaped fashion, the valve spring protrudes into the support element and rests on a bottom thereof, and the support element, with its bottom, comes to rest on the valve member; and wherein the support element, in the region of its bottom in which the support element comes to rest on the valve member, has at least one first opening of large cross section, and in a region of its bottom outside the contact with the valve member, it has at least one second opening of small cross section.

17. A fuel injection system for an internal combustion engine, having:

a high-pressure pump, by which fuel is delivered at high pressure at least indirectly to at least one injector; and a feed pump, by which fuel is delivered to the high-pressure pump, the high-pressure pump having at least one pump piston, which is driven in a reciprocating motion by a drive mechanism disposed in a drive region, a low-pressure region being formed between the feed pump and the high-pressure pump, the drive region of the high-pressure pump communicating with the low-pressure region, and in the low-pressure region, a fuel overflow valve being provided, wherein the fuel overflow valve includes:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member can execute a further stroke in the closing direction past its closing position, in which stroke the valve member is free to reciprocate within the valve housing without the influence of a spring.

18. The fuel injection system as defined by claim 17, wherein between the feed pump and the high-pressure pump, a fuel metering device is provided, by which the quantity of fuel delivered by the high-pressure pump is variably adjustable, and the low-pressure region extends between the feed pump and the fuel metering device.

19. A fuel injection system for an internal combustion engine, having:

a high-pressure pump, by which fuel is delivered at high pressure at least indirectly to at least one injector; and a feed pump, by which fuel is delivered to the high-pressure pump, the high-pressure pump having at least one pump piston, which is driven in a reciprocating motion by a drive mechanism disposed in a drive region, a low-pressure region being formed between the feed pump and the high-pressure pump, the drive region of the high-pressure pump communicating with the low-pressure region, and in the low-pressure region, a fuel overflow valve being provided, wherein the fuel overflow valve includes:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member can execute a further stroke in the closing direction past its closing position, in which stroke the valve spring does not act on the valve member;

wherein the valve spring acts on the valve member via a support element that is not connected to the valve member, and the support element comes to rest in the closing direction, in the vicinity of the closing position of the valve member, on a stop in the valve housing;

wherein the support element is guided displaceably in the valve housing and in the valve housing defines a chamber in which the valve spring is disposed, this chamber has a connection with a relief region, and this connection is controlled by the support element as a function of a stroke of the support element; and wherein the connection of the chamber with the relief region is opened when the support element rests on the stop and is closed by the support element upon motion of the support element in the direction toward the opening position of the valve member.

20. The fuel injection system as defined by claim 19, wherein between the feed pump and the high-pressure pump, a fuel metering device is provided, by which the quantity of fuel delivered by the high-pressure pump is variably adjustable, and the low-pressure region extends between the feed pump and the fuel metering device.

21. A fuel overflow valve for a fuel injection system, in particular for pressure limitation in a low-pressure region of the fuel injection system, having:

a valve housing;

a valve member disposed reciprocatingly in the valve housing;

a connection of an inlet to the valve housing with a relief region, which connection is controlled by reciprocating motion of the valve member; and a valve spring urging the valve member in a direction of a closing position, in which closing position the connection of the inlet with the relief region is interrupted, and pressure prevailing in the inlet urging the valve member in an opening direction, wherein the valve member is a slide-valve that can execute a further stroke in the closing direction past its closing position, in which stroke the valve spring does not act on the valve member.

* * * * *